(12) United States Patent
Yagi

(10) Patent No.: US 11,846,876 B2
(45) Date of Patent: Dec. 19, 2023

(54) PROJECTION SYSTEM AND CONTROL METHOD OF PROJECTION SYSTEM

(71) Applicant: SONY GROUP CORPORATION, Tokyo (JP)

(72) Inventor: Masato Yagi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 3 days.

(21) Appl. No.: 17/597,821

(22) PCT Filed: May 7, 2020

(86) PCT No.: PCT/JP2020/018486
§ 371 (c)(1),
(2) Date: Jan. 25, 2022

(87) PCT Pub. No.: WO2021/024561
PCT Pub. Date: Feb. 11, 2021

(65) Prior Publication Data
US 2022/0260899 A1  Aug. 18, 2022

(30) Foreign Application Priority Data
Aug. 2, 2019  (JP) .................................. 2019-142700

(51) Int. Cl.
*G03B 21/20* (2006.01)
*G03B 21/00* (2006.01)

(52) U.S. Cl.
CPC ......... *G03B 21/206* (2013.01); *G03B 21/006* (2013.01); *G03B 21/2006* (2013.01); *G03B 21/2053* (2013.01)

(58) Field of Classification Search
CPC .... G03B 21/006; G03B 21/008; G03B 21/28; G03B 21/206; G03B 21/208;
(Continued)

(56) References Cited

U.S. PATENT DOCUMENTS 5,537,258 A    7/1996  Yamazaki et al.
10,211,268 B1 *  2/2019  Rutherford ............ H10K 59/00
(Continued)

FOREIGN PATENT DOCUMENTS

CN    1379386 A    11/2002
CN    1542723 A    11/2004
(Continued)

OTHER PUBLICATIONS

International Search Report and Written Opinion of PCT Application No. PCT/JP2020/018486, dated Jul. 14, 2020, 14 pages of ISRWO.

*Primary Examiner* — Sultan Chowdhury
(74) *Attorney, Agent, or Firm* — CHIP LAW GROUP

(57) ABSTRACT

There is provided a projection system that includes a light source, a display panel, a projection optical system, and a controller. The light source outputs light of a plurality of colors. The display panel includes a light modulation element provided for each pixel, and modulates the light outputted from the light source. The projection optical system projects light having passed through the display panel, and the controller controls light output of each color of the light source in a time-axis direction. This configuration is adopted to achieve an improvement in brightness of a projected image/a screen and prevention of color mixing in field sequential driving.

10 Claims, 12 Drawing Sheets

(58) Field of Classification Search
CPC ............ G03B 21/2006; G03B 21/2053; G03B 21/2066; G09G 3/34; G09G 3/36; G09G 3/342; G09G 3/3406; G09G 3/3413; H04N 9/31; H04N 9/315; H04N 9/3102; H04N 9/3105; H04N 9/3123; H04N 9/3132; H04N 9/3135; H04N 9/3141
See application file for complete search history.

(56) References Cited

U.S. PATENT DOCUMENTS

| | | | |
|---|---|---|---|
| 11,624,970 B2 * | 4/2023 | Toriyama | G03B 21/2073 349/8 |
| 2002/0149576 A1 | 10/2002 | Tanaka et al. | |
| 2004/0207609 A1 | 10/2004 | Hata et al. | |
| 2006/0119797 A1 * | 6/2006 | Ockenfuss | H04N 9/3114 353/31 |
| 2006/0279710 A1 * | 12/2006 | Tani | H04N 9/3155 348/E5.142 |
| 2015/0268544 A1 * | 9/2015 | Narikawa | H04N 5/74 353/121 |
| 2017/0214897 A1 * | 7/2017 | Kado | G03B 21/206 |
| 2019/0052850 A1 * | 2/2019 | Iguchi | H04N 9/3126 |
| 2020/0120771 A1 * | 4/2020 | Nagauchi | G03B 33/08 |

FOREIGN PATENT DOCUMENTS

| | | |
|---|---|---|
| EP | 1253577 A1 | 10/2002 |
| EP | 1455337 A1 | 9/2004 |
| JP | 5-150209 A | 6/1993 |
| JP | 2002-351431 A | 12/2002 |
| JP | 2002-366124 A | 12/2002 |
| JP | 2004-287420 A | 10/2004 |
| JP | 2006-058900 A | 3/2006 |
| JP | 2009-282284 A | 12/2009 |
| JP | 2013-044831 A | 3/2013 |
| JP | 2013-109227 A | 6/2013 |
| KR | 10-1993-0010577 A | 6/1993 |
| KR | 10-2002-0080249 A | 10/2002 |
| KR | 10-1037486 B1 | 5/2011 |

* cited by examiner

[FIG. 1]
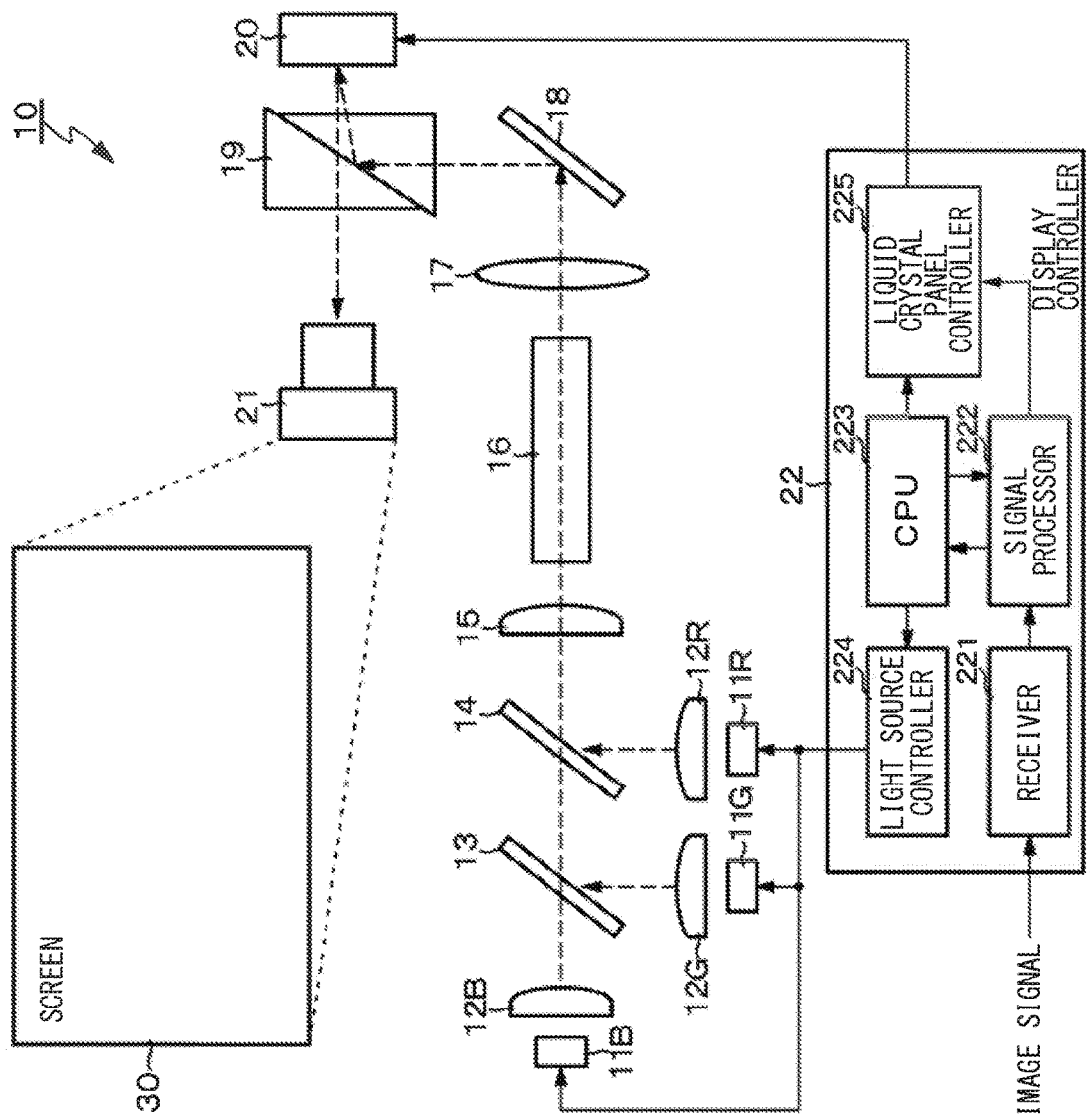

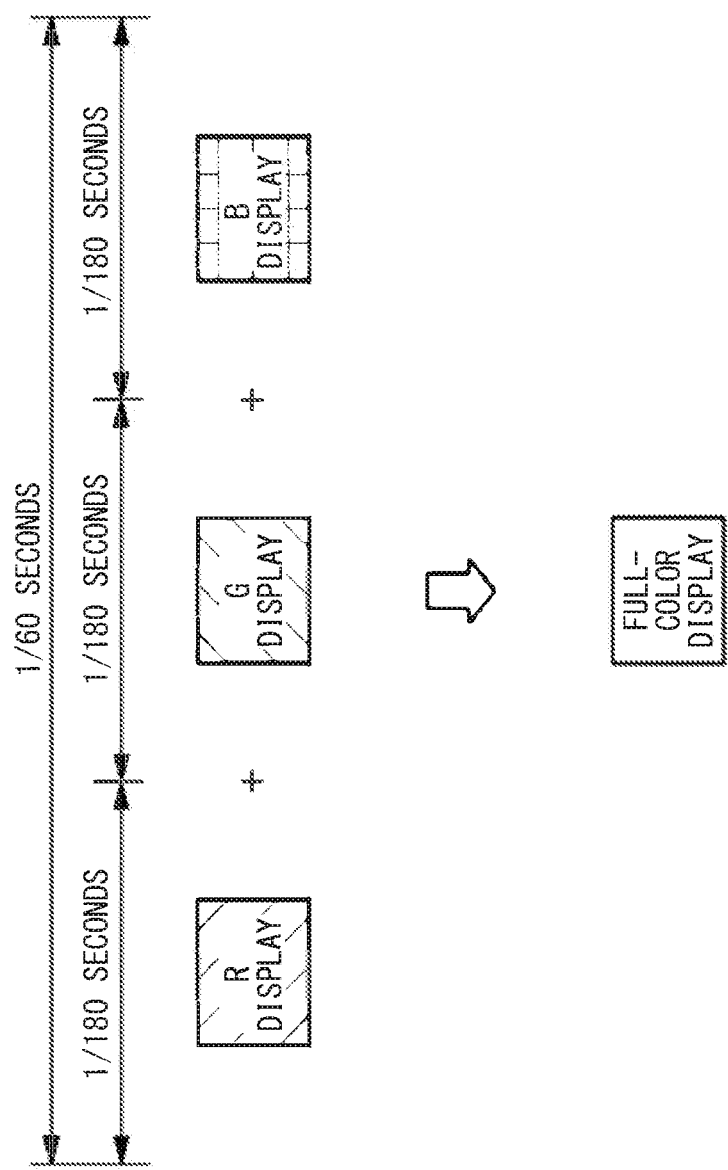
[FIG. 2]

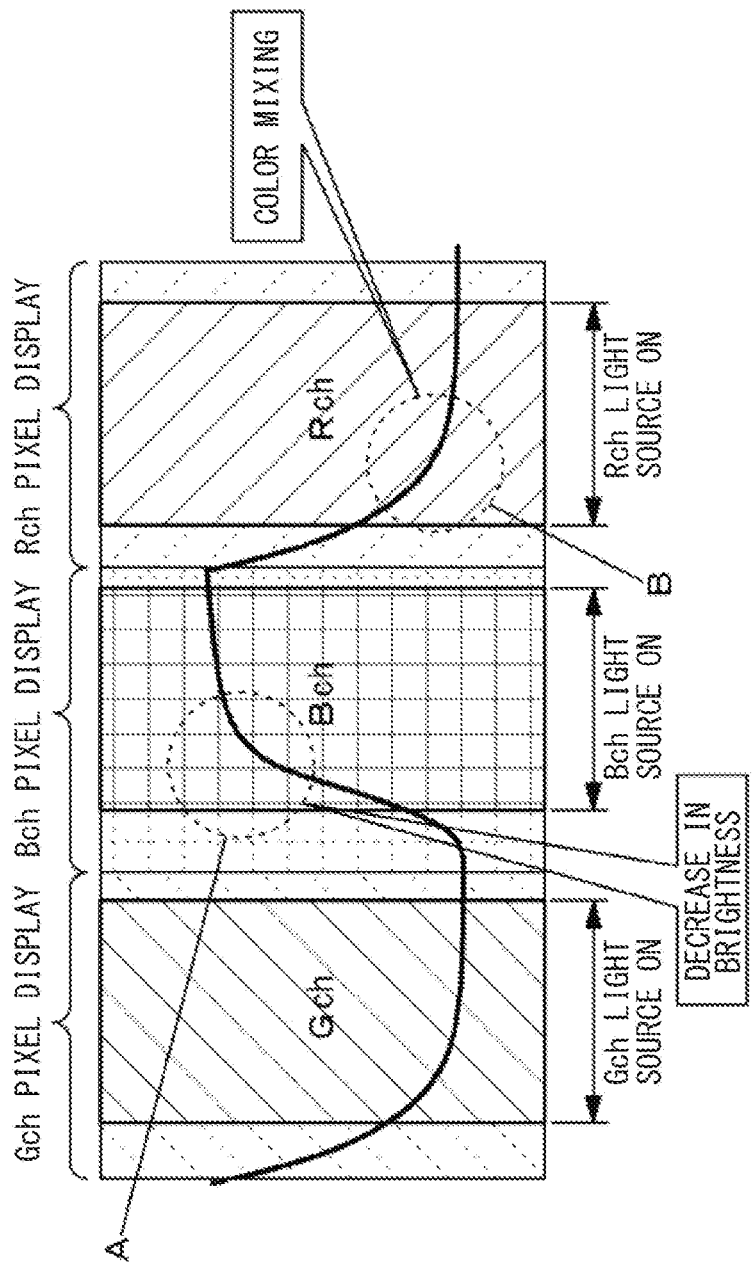

[FIG. 4]
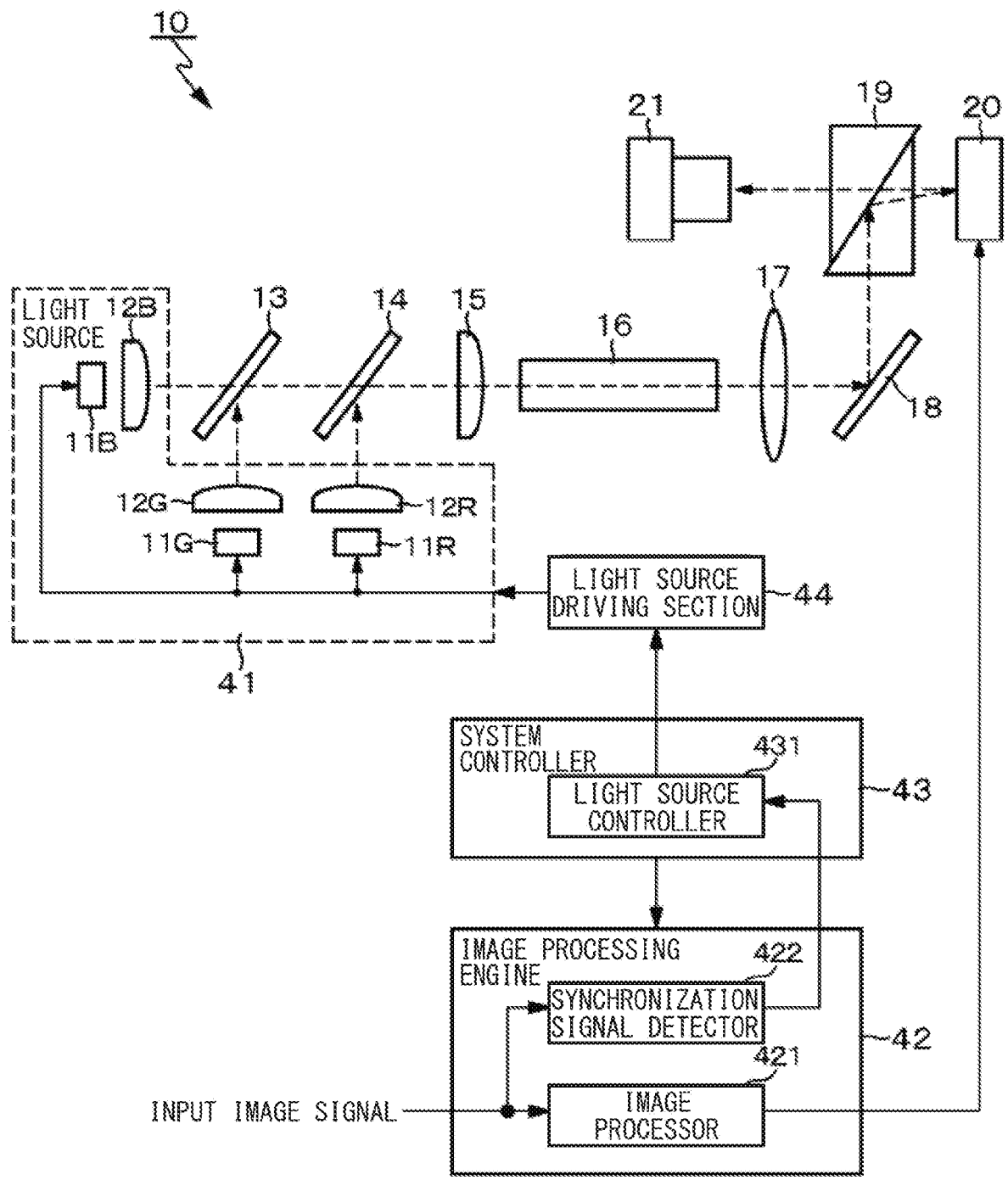

[FIG. 5A]
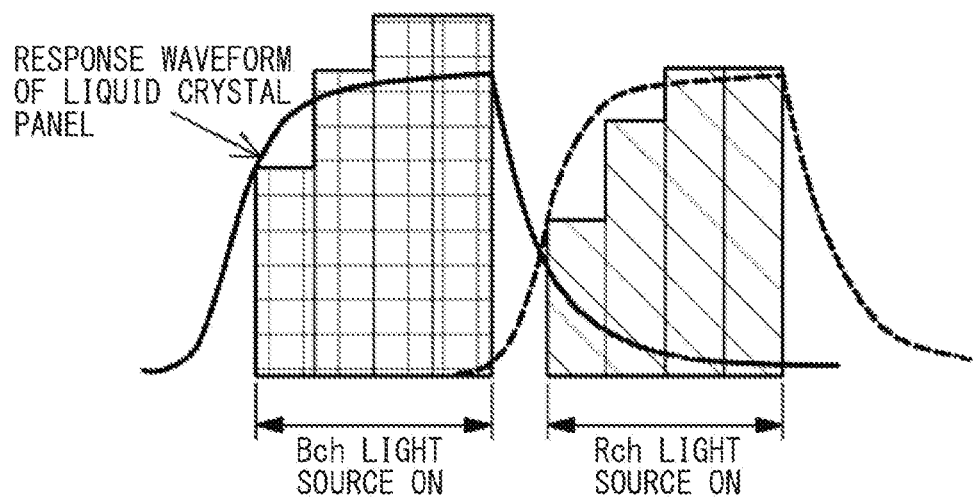
[FIG. 5B]
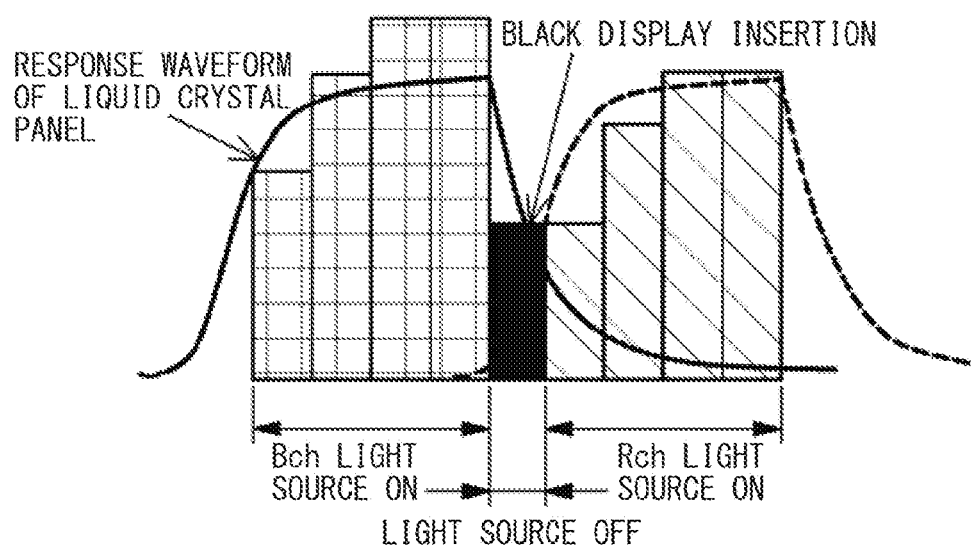

[FIG. 6]
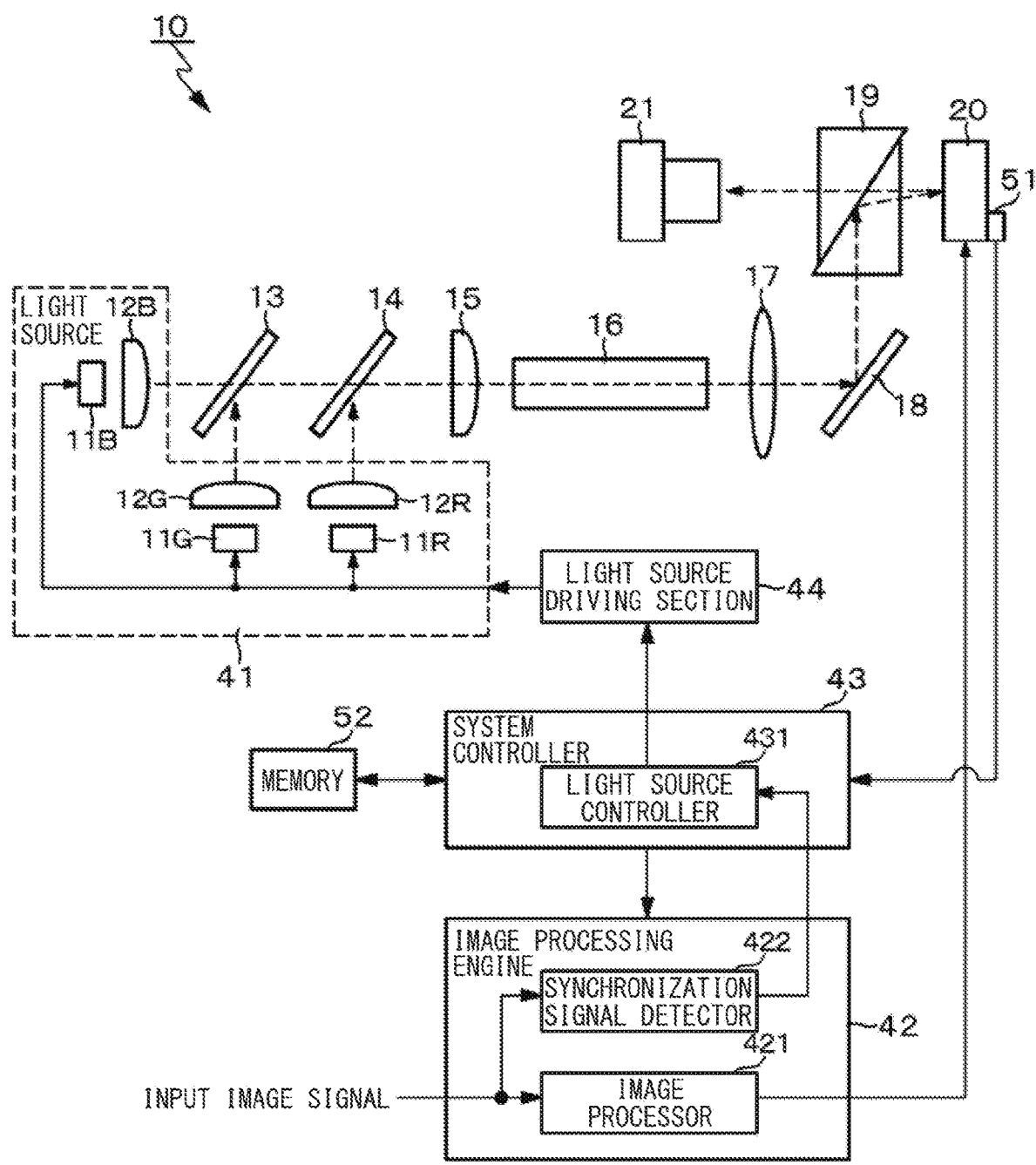

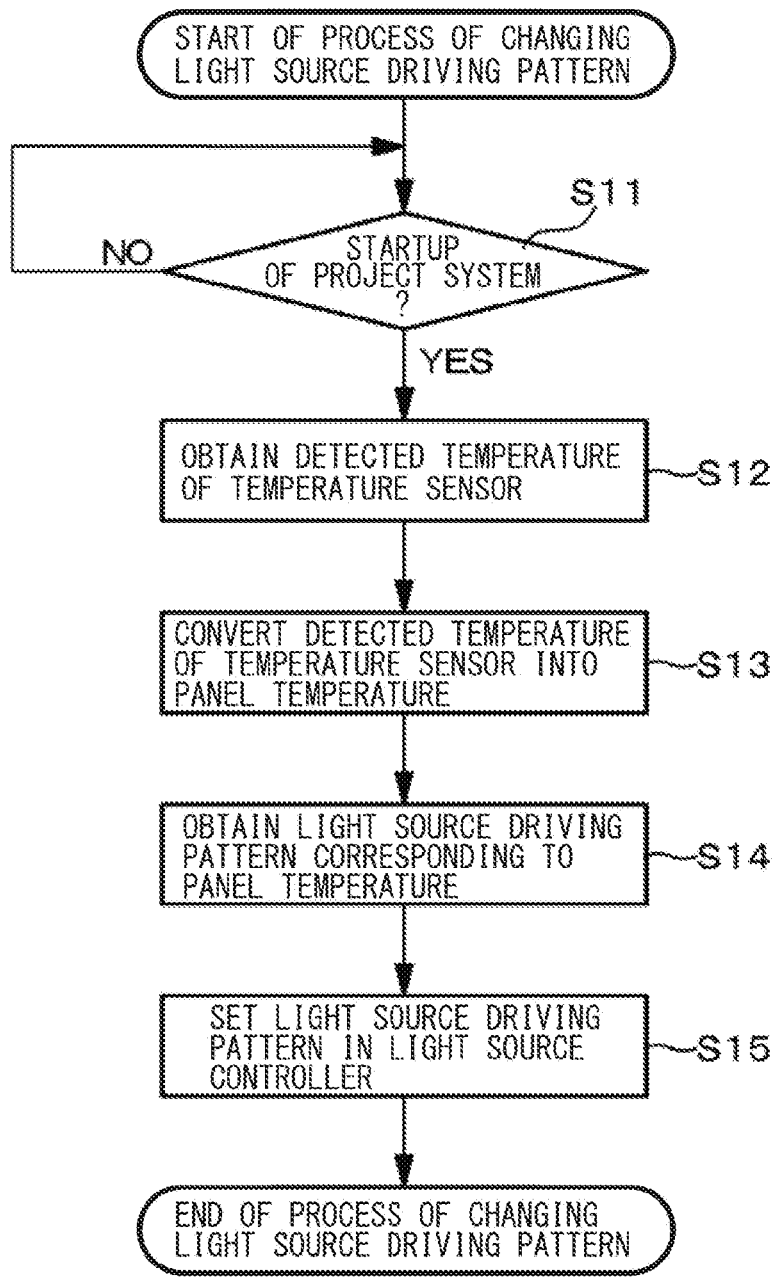
[FIG. 7]

[FIG. 8]
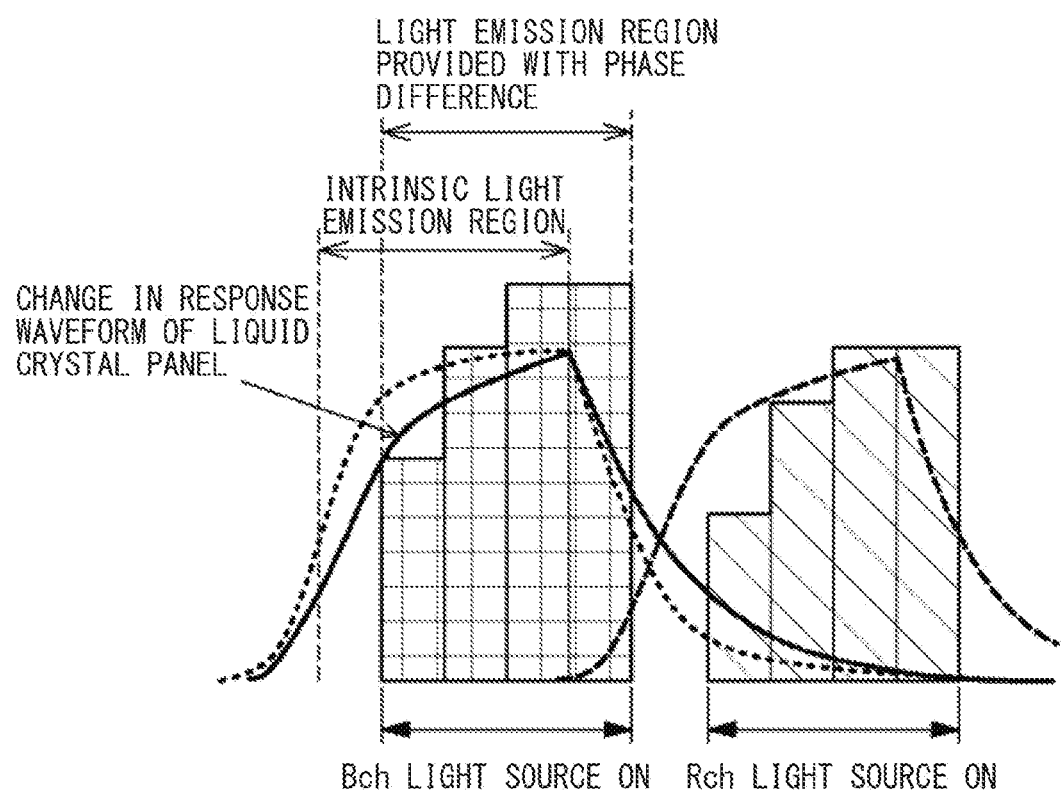

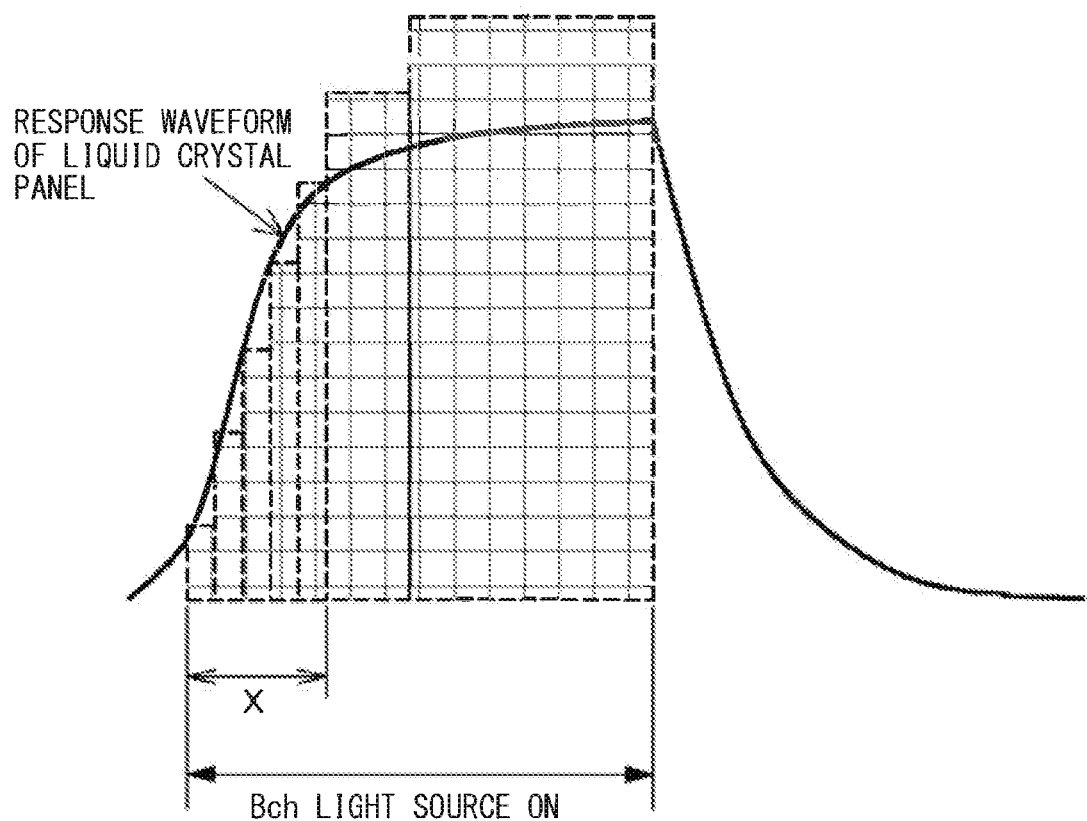

[FIG. 10]
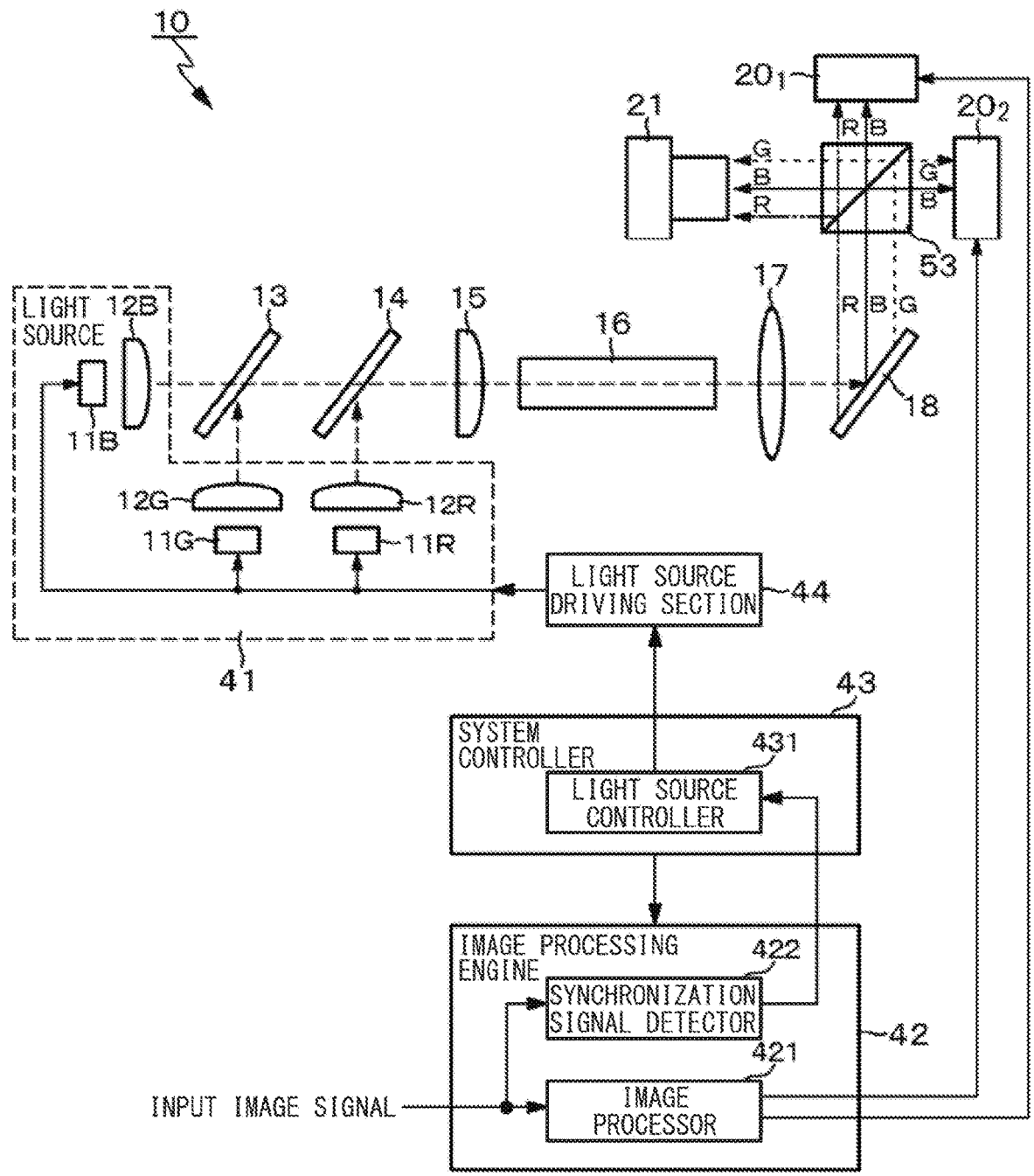

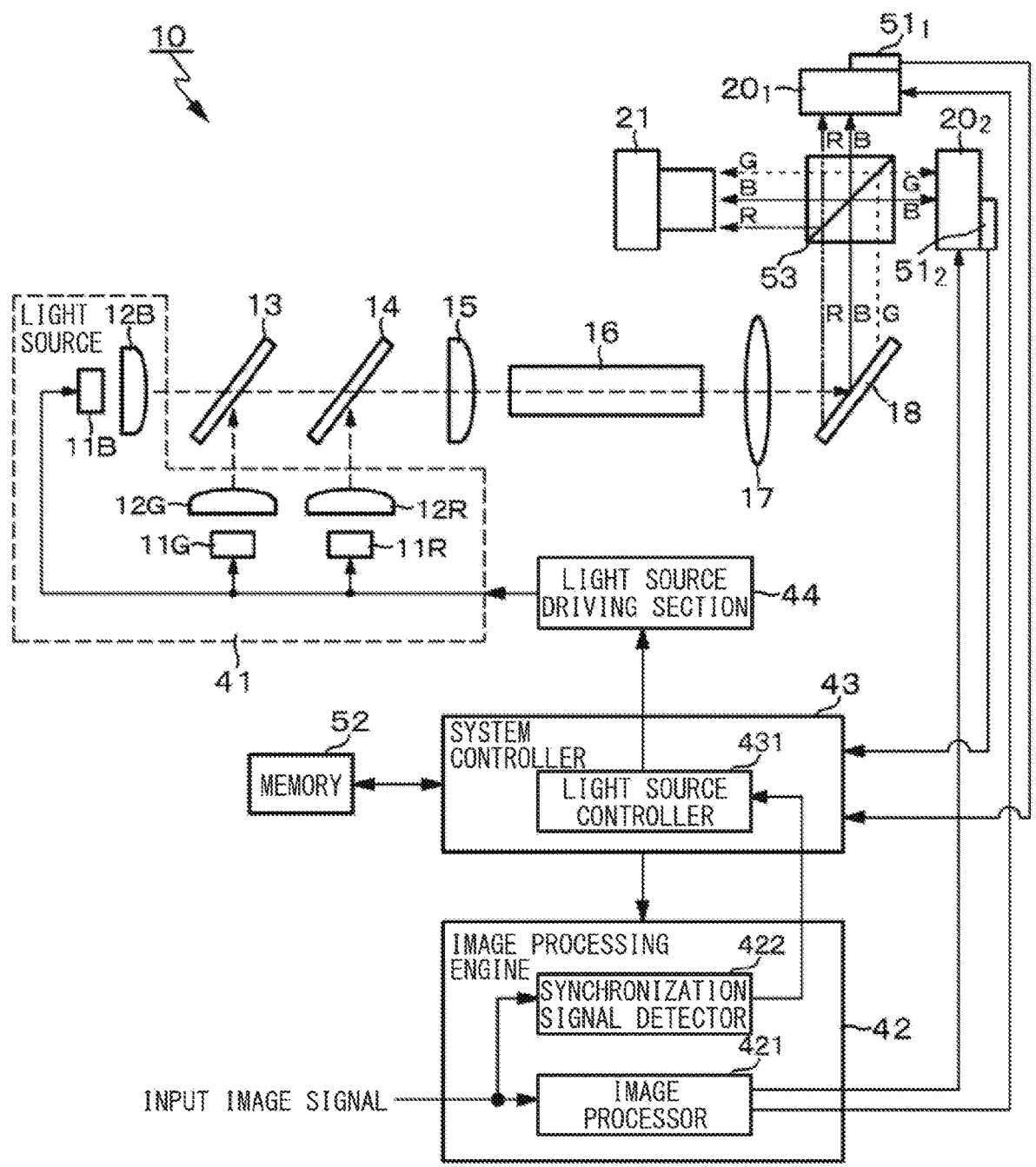
[FIG. 11]

[FIG. 12]
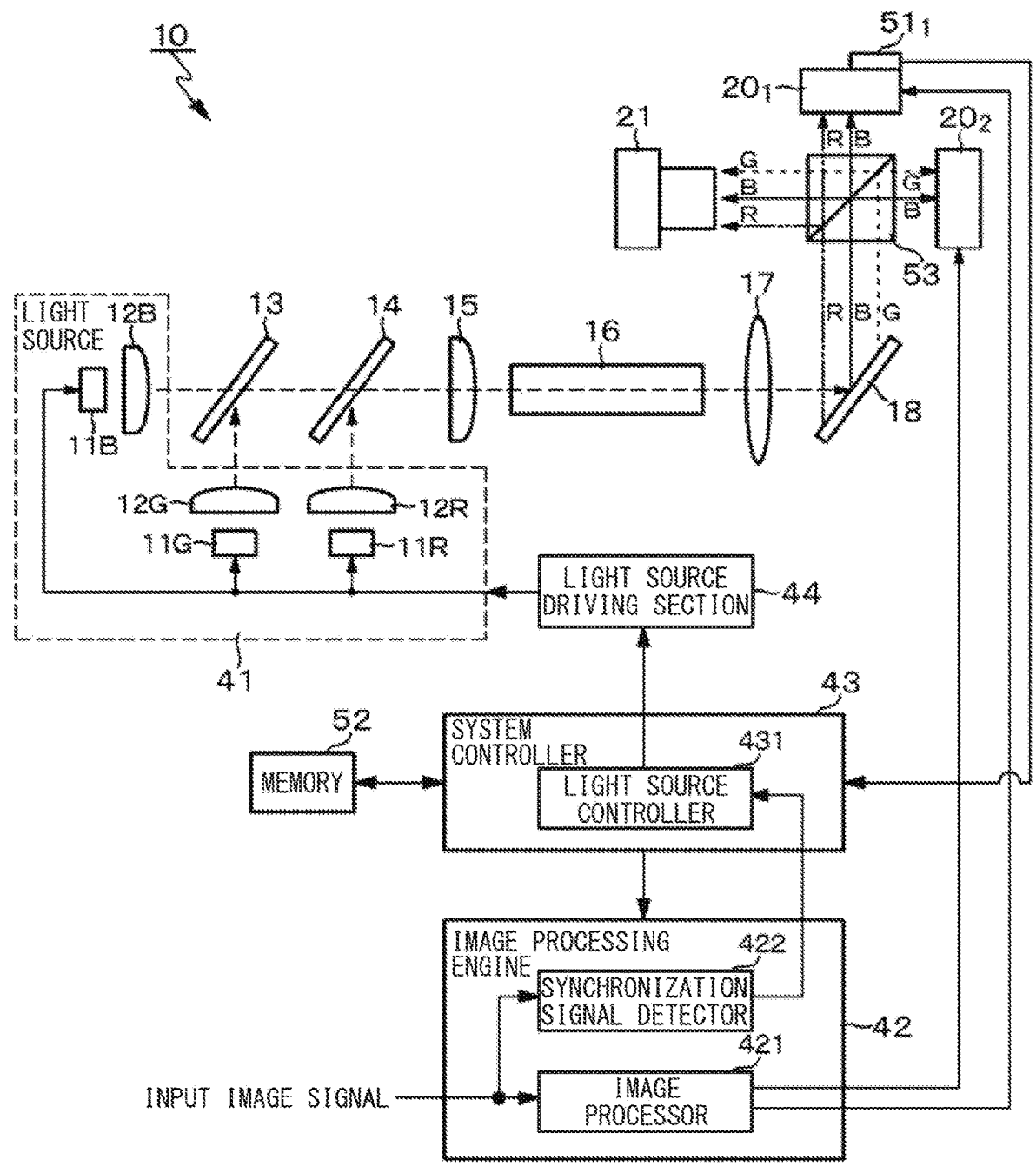

PROJECTION SYSTEM AND CONTROL METHOD OF PROJECTION SYSTEM

CROSS REFERENCE TO RELATED APPLICATIONS

This application is a U.S. National Phase of International Patent Application No. PCT/JP2020/018486 filed on May 7, 2020, which claims priority benefit of Japanese Patent Application No. JP 2019-142700 filed in the Japan Patent Office on Aug. 2, 2019. Each of the above-referenced applications is hereby incorporated herein by reference in its entirety.

TECHNICAL FIELD

The present disclosure relates to a projection system (a projector/a projection type display device) and a control method of a projection system.

BACKGROUND ART

In projection systems, displaying methods for display panels include a plane division method and a field sequential method (a field color sequential method). The plane division method is a method of performing full-color display by spatially displaying three primary colors of R (red), G (green), and B (blue) and spatially mixing these colors. The field sequential method is a method of performing full-color display by temporally and sequentially displaying images of R, G, and B and temporally mixing the images. The field sequential method makes it possible to obtain brighter images as compared with spatial plane division (the plane division method).

Incidentally, in a case where color sequential driving is performed in a field sequential (time division) manner, poor responsiveness of a light modulation element may cause issues of a decrease in an amount of reflected light and color mixing of adjacent colors. PTL 1 (Japanese Unexamined Patent Application Publication No. 2006-58900) describes a technology for achieving an improvement in brightness of a projected image/a screen by performing light source control in a stepwise manner in performing sequential color display to correct responsiveness of a light valve light source.

CITATION LIST

Patent Literature

PTL 1: Japanese Unexamined Patent Application Publication No. 2006-58900

SUMMARY OF THE INVENTION

Problem to be Solved by the Invention

According to an existing technology described in the above PTL 1, it is possible to prevent darkening of display in performing sequential color display. However, in the existing technology, no consideration is given to color mixing resulting from poor responsiveness of a light modulation element.

An object of the present disclosure is to provide a projection system and a control method of a projection system that make it possible to achieve an improvement in brightness of a projected image/a screen, and prevention of color mixing.

Means for Solving the Problem

A protection system of the present disclosure to achieve the above-described object includes:
  a light source that outputs light of a plurality of colors;
  a display panel that includes a light modulation element provided for each pixel, and modulates the light outputted from the light source;
  a projection optical system that projects light having passed through the display panel; and
  a controller that controls light output of each color of the light source in a time-axis direction.

A control method of a protection system of the present disclosure to achieve the above-described object, the projection system including
  a light source that outputs light of a plurality of colors,
  a display panel that includes a light modulation element provided for each pixel, and modulates the light outputted from the light source, and
  a projection optical system that projects light having passed through the display panel,
  the control method including:
  upon control of the projection system, controlling light output of each color of the light source in a time-axis direction.

BRIEF DESCRIPTION OF THE DRAWINGS

FIG. 1 is a system configuration diagram illustrating an example of a basic system configuration of a projection system.

FIG. 2 is a diagram that describes a display principle of a field sequential method.

FIG. 3 is a diagram that describes issues in a case where color sequential driving is performed in a field sequential (time division) manner in a single-panel liquid crystal panel.

FIG. 4 is a system configuration diagram illustrating a system configuration of a single-panel type projection system according to an example 1.

FIG. 5A is an explanatory diagram of light output control of a light source in the projection system according to the example 1, and FIG. 5B is a diagram that describes black display insertion into a color mixing region.

FIG. 6 is a system configuration diagram illustrating a system configuration of a projection system according to an example 2.

FIG. 7 is a flowchart illustrating a flow of a process of changing a light source driving pattern.

FIG. 8 is diagram illustrating a result by the process of changing the light source driving pattern.

FIG. 9 is an explanatory diagram about an interval of light source control according to an example 3.

FIG. 10 is a system configuration diagram illustrating a system configuration of a projection system according to an example 4.

FIG. 11 is a system configuration diagram illustrating a system configuration of a projection system according to an example 5.

FIG. 12 is a system configuration diagram illustrating a system configuration of a projection system according to an example 6.

MODES FOR CARRYING OUT THE INVENTION

Hereinafter, modes for carrying out the technology of the present disclosure (hereinafter referred to as "embodiments") are described in detail with reference to the drawings. The technology of the present disclosure is not limited to the embodiments. In the following description, the same components, or components having the same function are denoted by the same reference signs, and redundant description is omitted. It is to be noted that description is given in the following order.

1. Overall Description of Projection System and Control Method Thereof of Present Disclosure
2. Overview of Projection System
2-1. Basic System Configuration Example
2-2. About Field Sequential Method
3. Projection System according to Embodiment
3-1. Example 1 (a system configuration example in a single-panel type)
3-1-1. System Configuration
3-1-2. Operation and Workings
3-2. Example 2 (a modification example of the example 1: an example in which light source control is performed in consideration of a panel temperature)
3-2-1. System Configuration
3-2-2. Process of Changing Light Source Driving Pattern
3-3. Example 3 (a modification example of the example 1: an example in which an interval of light source control is variable)
3-4. Example 4 (a system configuration example in a two-panel type)
3-5. Example 5 (a modification example of the example 4: an example in which a light source is driven in consideration of both temperatures of two panels)
3-6. Example 6 (a modification example of the example 4: an example in which the light source is driven in consideration of a temperature of one of two panels)
4. Modification Examples
5. Possible Configurations of Present Disclosure <Overall Description of Projection System and Control Method Thereof of Present Disclosure>

In a projection system of the present disclosure, a display panel may be configured to be a liquid crystal panel including a liquid crystal element as a light modulation element. In addition, a controller may be configured to perform field sequential driving for color-sequentially driving a light source in a time-division manner.

In the projection system of the present disclosure including the preferred configurations described above and a control method thereof, the controller may have a configuration in which light output of each color of the light source is controlled in a time-axis direction in a stepwise manner in accordance with responsiveness of the liquid crystal panel, and preferably, a configuration in which light output between one color and another color of the light source is reduced or turned off.

In addition, the projection system of the present disclosure including the preferred configurations described above and the control method thereof, a configuration may be adopted in which control of light output in the time-axis direction is performed to be proportional to a response waveform of the liquid crystal panel. In addition, a configuration may be adopted in which light output is changed independently for respective colors of the light source in accordance with responsiveness of the liquid crystal panel.

In addition, in the projection system of the present disclosure including the preferred configurations described above and the control method thereof, the controller may be configured to drive the light source with a light source driving pattern of a driving timing having a phase difference corresponding to a temperature of the liquid crystal panel with respect to a driving timing of the liquid crystal panel. In addition, a configuration may be adopted in which a temperature sensor that detects the temperature of the liquid crystal panel and a memory that stores, as a light source driving table, light source driving patterns for temperatures of the driving timing of the light source with respect to the driving timing of the liquid crystal panel are included, and the controller may be configured to obtain a light source driving pattern corresponding to a temperature detected by the temperature sensor from the light source driving table and drive the light source on the basis of the thus-obtained light source driving pattern.

In addition, in the projection system of the present disclosure including the preferred configurations described above and the control method thereof, the controller may have a configuration in which an interval of light source control in the time-axis direction is controllable, and preferably a configuration in which the interval of light source control is narrower in a region in which change in the response waveform of the liquid crystal panel is steep than in another region.

In addition, in the projection system of the present disclosure including the preferred configurations described above and the control method thereof, the display panel may have a two-panel configuration provided with two liquid crystal panels. In addition, a configuration may be adopted in which a temperature sensor that detects a temperature of at least one of the two liquid crystal panels, and a memory that stores, as a light source driving table, light source driving patterns for temperatures of the driving timing of the light source with respect to driving timings of the two liquid crystal panels are included, and the controller may be configured to obtain a light source driving pattern corresponding to a temperature detected by the temperature sensor provided in at least one of the two liquid crystal panels from the light source driving table and drive the light source on the basis of the thus-obtained light source driving pattern.

<Overview of Projection System>

First, description is given of an overview of an projection system (a projector/a projection type display device) to which the technology of the present disclosure is applied. Here, a projection system using a liquid crystal panel as an display panel is described as an example. The liquid crystal panel includes a liquid crystal element as a light modulation element provided for each pixel.

The liquid crystal panel is classified into a transmissive type and a reflective type. Further, as a silicon material used in a thin film transistor (TFT: Thin Film Transistor) that is used in a pixel, amorphous silicon (non-crystalline semiconductor) and polysilicon (polycrystalline semiconductor) are often used in the transmissive type liquid crystal panel. In the reflective type liquid crystal panel, single-crystal silicon is often used.

[Basic System Configuration Example]

FIG. 1 is a system configuration diagram illustrating an example of a basic system configuration of the projection system. Here, description is given of a system configuration in which one reflective type liquid crystal panel using LCOS (Liquid Crystal On Silicon) as a light modulation element, that is, a single panel is used.

As illustrated in FIG. 1, a projection system 10 according to the present example includes solid-state light sources 11R, 11G, and 11B of R (red), G (green), and B (blue). For example, any light source such as a laser diode (LD), a light emitting diode (LED), an organic light emitting diode (OLED), a YAG phosphor light source, and a lamp may be used as each of the solid-state light sources 11R, 11G, and 11B.

Light outputted from the solid-state light sources 11R, 11G, and 11B of R, G, and B respectively passes through lenses 12R, 12G, and 12B, and then enters a rod integrator 16 through dichroic mirrors 13 and 14 and a lens 15. The light uniformized by the rod integrator 16 passes through a lens 17, a mirror 18, and a total reflection prism 19, and is applied to a display panel (liquid crystal panel) 20. The total reflection prism 19 includes a combination of two triangular prisms.

The liquid crystal panel 20 has a configuration in which pixels are arranged in a two-dimensional matrix (rows and columns) and a liquid crystal material is provided as a liquid modulation element for each pixel. The solid-state light sources 11R, 11G, and 11B, and the liquid crystal panel 20 are controlled by a display controller 22. The display controller 22 includes a receiver 221, a signal processor 222, a CPU (Central Processing Unit) 223, a light source controller 224, and a liquid crystal panel controller 225.

In the displaying controller 22 having the configuration described above, in a case where the single-panel liquid crystal panel 20 is used, the light source controller 224 temporally controls light emission of each of light sources of respective colors, that is, the solid-state light sources 11R, 11G, and 11B of R, G, and B under control by the CPU 223. The signal processor 222 performs predetermined signal processing on an image signal inputted from outside through the receiver 221 under control by the CPU 223, and supplies the image signal as image data to the liquid crystal panel controller 225.

The liquid crystal panel controller 225 drives the liquid crystal panel 20 on the basis of the image data supplied from the signal processor 222. Then, light modulated by the liquid crystal panel 20 in accordance with the inputted image data is projected as a projected image onto a screen 30 through the total reflection prism 19 and a projection lens 21. The screen 30 is an example of a projection target.

[About Field Sequential Method]

In the projection system having the configuration described above, a field sequential method is used as a displaying method of the liquid crystal panel 20. In a method of performing color sequential driving by the field sequential method, that is, in a field sequential (time division) manner, as illustrated in FIG. 2, full-color display is performed by temporally and sequentially displaying images of a plurality of colors, for example, R (red), G (green), and B (blue), which are three primary colors, and temporally mixing the images.

Incidentally, in case where in a single-panel liquid crystal panel, color sequential driving is performed in a field sequential (time division) manner, poor responsiveness of the liquid crystal panel may cause issues of a decrease in an amount of reflected light and color mixing of adjacent colors. Specifically, in FIG. 3, an intrinsic amount of reflected light is not obtained by a dulled rise (a portion surrounded by a broken line A) of a liquid crystal response waveform. In addition, a fall of the liquid crystal response waveform is laid on light emission of an adjacent color (a portion surrounded by a broken line B), which causes color mixing.

It is possible to solve the issue of the decrease in the amount of reflected light by a mechanism for making movement of a liquid crystal element (switching of emission colors) faster by applying a voltage higher than usual to the liquid crystal element upon changing a color on a screen. However, in this case, an upper limit voltage that is applicable to the liquid crystal panel is determined; therefore, it is only possible to apply the mechanism to halftones. In addition, the fall of the liquid crystal response waveform is further dulled, which causes a color mixing region to grow.

It is possible to avoid the issue of color mixing by causing the light source to emit light in a section excluding a section where color mixing occurs. However, in this case, a light emission section of the light source is shortened, which decreases brightness of a projected image.

<Projection System According to Embodiment>

In the embodiment of the present disclosure, in a projection system including a light source that outputs light of a plurality of colors, and a single-panel or two-panel liquid crystal panel as a display panel, in color-sequentially driving the light source in a time division manner, light output of each color of the light source is controlled in a time-axis direction. As described above, in field sequential driving, light output of each color of the light source is controlled in the time-axis direction, which makes it possible to improve brightness of a projected image/a screen and prevent color mixing. Furthermore, it is possible to efficiently use light output of the light source, which makes it possible to reduce power consumption of a display device and suppress a rise in temperature.

Hereinafter, description is given of a specific example of the projection system according to the embodiment of the present disclosure that controls light output of each color of the light source in the time-axis direction in field sequential driving for color-sequentially driving in a time division manner.

Example 1

An example 1 is a system configuration example of a single-panel type projection system according to the embodiment of the present disclosure. FIG. 4 is a system configuration diagram of the single-panel type projection system according to the example 1.

(System Configuration)

A projection system 10 according to the example 1 includes a light source (light source unit) 41, an image processing engine 42, a system controller 43, and a light source driving section 44, in addition to an optical system including the rod integrator 16 and the like, the liquid crystal panel 20, and a projection optical system including the projection lens 21.

The light source 41 includes, for example, the solid-state light sources 11R, 11G, and 11B that respectively output (emit) light of R (red), G (green), and B (blue) as a plurality of colors, and lenses 12R, 12G, and 12B respectively provided corresponding to the solid-state light sources 11R, 11G, and 11B. For example, any light source such as a laser diode (LD), a light emitting diode (LED), an organic light emitting diode (OLED), a YAG phosphor light source, and a lamp may be used as each of the solid-state light sources 11R, 11G, and 11B.

The image processing engine 42 includes an image processor 421 and a synchronization signal detector 422. The image processor 421 performs various image processing such as gamma (γ) processing on an image signal (a picture signal) inputted from outside, and a process of changing a synchronization timing. The image signal having been processed by the image processor 421 is supplied to the liquid crystal panel 20. The synchronization signal detector 422 detects a synchronization signal included in the image signal inputted from outside.

The system controller 43 includes, for example, a microprocessor, and has a function of the light source controller 431. The synchronization signal detected by the synchronization signal detector 422 is supplied from the image processing engine 42 to the light source controller 431. For the light source driving section 44 that drives each of the solid-state light sources 11R, 11G, and 11B of the light source 41, the light source controller 431 performs setting of a light emission timing corresponding to the synchronization signal detected by the synchronization signal detector 422 of the image processing engine 42 and control of light output.

(Operation and Workings)

Description is given of an operation and workings of light source control in the projection system 10 according to the example 1 having the configuration described above with reference to FIG. 5A. FIG. 5A is an explanatory diagram of light output control of the light source 41 in the projection system 10 according to the example 1.

The light source controller 431, which is one of functional sections included in the system controller 43, does not keep light output of light source 41 constant as illustrated in FIG. 5B, but controls light output of each color of the light source 41 in the time-axis direction in a stepwise manner in accordance with a response waveform (reflectance) representing responsiveness of the liquid crystal panel 20. Furthermore, the light source controller 431 reduces light output of the light source 41 (i.e., suppresses a light amount) between one color and another color of the light source 41, for example, between blue and red in an example in FIG. 5B, that is, in a color mixing region, or turns the light output to an off state (i.e., a non-illuminated state). Here, turning the light output of the light source 41 in the color mixing region to the off state (the non-illuminated state) means inserting black display into the color mixing region as illustrated in FIG. 5B.

As described above, the light output of each color of the light source 41 is controlled in the time-axis direction in a stepwise manner in accordance with responsiveness of the liquid crystal panel 20, which makes it possible to suppress a decrease in the amount of reflected light resulting from poor responsiveness of the liquid crystal panel 20. This makes it possible to improve brightness of a projected image and prevent color mixing. In particular, reducing light output of the light source 41 in a color mixing region between different colors makes it possible to reliably reduce color mixing. In addition, turning the light output of light source 41 to the off state to insert black display into the color mixing region makes it possible to more reliably prevent color mixing.

As a standard, control of the light output in the time-axis direction is performed to be proportional to a response waveform of the liquid crystal panel 20, and it is preferable to eventually perform fine adjustment in consideration of balance between brightness of a projected image and reduction in a color gamut by color mixing.

In addition, it is possible to change light output independently for respective colors of the light source 41 in accordance with responsiveness of the liquid crystal panel 20. Controlling the light output independently for respective colors in such a manner makes it possible to also perform white balance adjustment.

Example 2

An example 2 is a modification example of the example 1, and is an example in which light source control is performed in consideration of a temperature (a panel temperature) of the liquid crystal panel 20. FIG. 6 illustrates a system configuration example of a projection system according to the example 2.

(System Configuration)

Responsiveness of the liquid crystal panel 20 is changed by an influence of temperature dependence of the liquid crystal panel 20. Accordingly, in the projection system 10 according to the example 2, in consideration of the temperature of the liquid crystal panel 20, under control by the light source controller 431, control is performed to drive the light source 41 at a driving timing having a phase difference corresponding to the temperature of the liquid crystal panel 20 with respect to a driving timing of the liquid crystal panel 20.

Specifically, as illustrated in FIG. 6, the projection system 10 according to the example 2 includes a temperature sensor 51 that detects (obtains) the temperature of the liquid crystal panel 20, and a memory 52 that stores, as a light source driving table, light source driving patterns for temperatures of the driving timing of the light source 41 with respect to the driving timing of the liquid crystal panel 20. Then, the light source controller 431 obtains a light source driving pattern corresponding to a temperature detected by the temperature sensor 51 from the light source driving table stored in the memory 52 to change the light source driving pattern, and drives the light source 41 on the basis of the thus-changed light source driving pattern.

(Process of Changing Light Source Driving Pattern)

Description is given of a process of changing the light source driving pattern with use of a flowchart in FIG. 7. FIG. 7 is a flowchart illustrating a flow of the process of changing the light source driving pattern. It is to be noted that the process of changing the light source driving pattern is executed under control by the system controller 43 including a microprocessor.

In a case where the system controller 43 monitors startup of the projection system 10 (step S11), and recognizes system startup (YES in S11), the system controller 43 obtains a detected voltage of the temperature sensor 51 (step S12) and then converts the detected voltage of the temperature sensor 51 into a temperature (a panel temperature) of the liquid crystal panel 20 (step S13).

Next, the system controller 43 obtains a light source driving pattern corresponding to the temperature of the liquid crystal panel 20 from the light source driving table stored in the memory 52 (step S14), and then sets, in the light source controller 431, the light source driving pattern obtained from the light source driving table as a light source driving pattern for driving the light source 41 (step S15).

The light source driving pattern set in the light source controller 431 is changed corresponding to the temperature of the liquid crystal panel 20 by the above processes. The light source controller 431 performs control of the light source 41 on the basis of the thus-changed light source driving pattern. FIG. 8 illustrates a result by the process of changing the light source driving pattern. FIG. 8 illustrates a relationship between an intrinsic light emission region and a light emission region provided with a phase difference corresponding to the temperature of the liquid crystal panel 20.

As described above, in the example 2, considering that responsiveness of the liquid crystal panel 20 is changed by the influence of temperature dependence of the liquid crystal panel 20, the light source 41 is driven at a driving timing having a phase difference corresponding to the temperature of the liquid crystal panel 20 with respect to the driving timing of the liquid crystal panel 20. This makes it possible to balance brightness of a projected image and color mixing more easily, as compared with the example 1.

Example 3

An example 3 is a modification example of the example 1, and is an example in which an interval of light source control in the time-axis direction is variable. FIG. 9 illustrates an explanatory diagram about the interval of light source control according to the example 3.

In the example 1, the interval of light source control in a case where light output of the light source 41 is controlled in the time-axis direction in a stepwise manner is equal. In contrast, in the example 3, the interval of light source control in a case where light output of the light source 41 is controlled in the time-axis direction in a stepwise manner is variable. More specifically, as illustrated in FIG. 9, in the example 3, in a case where light output of the light source 41 is controlled in the time-axis direction in a stepwise manner, the interval of the light source control is narrower in a region X in which change in the response waveform of the liquid crystal panel 20 is steep than in a region other than the region X in which the change is steep.

In a case where light output of the light source 41 is controlled in the time-axis direction in a stepwise manner, the interval of the light source control is narrowed in the region X in which change in the response waveform of the liquid crystal panel 20 is steep, which makes it possible to provide an ideal light amount. The technology according to the example 3 is also applicable to the projection system 10 according to the example 2 in which light source control is performed in consideration of the temperature of the liquid crystal panel 20.

Example 4

An example 4 is a system configuration example of a two-panel type projection system according to the embodiment of the present disclosure. FIG. 10 illustrates a system configuration diagram of the two-panel type projection system according to the example 4.

As illustrated in FIG. 10, the projection system 10 according to the example 4 has two-panel configuration including two liquid crystal panel $20_1$ and $20_2$ as display panels. With the two-panel configuration, the projection system 10 according to the example 4 includes an optical system including the light source 41, and a polarization beam splitter 53 between both the two liquid crystal panels $20_1$ and $20_2$ and a projection optical system including the projection lens 21.

In the two-panel type projection system 10 having the configuration described above, in a case where light of each of R, G, and B is emitted from the optical system including the light source 41, for example, the light of each of R and B passes through the polarization beam splitter 53, and is applied to the liquid crystal panel $20_1$, and the light of each of G and B is reflected by the polarization beam splitter 53, and is applied to the liquid crystal panel $20_2$. Then, the light of each of R and B modulated in the liquid crystal panel $20_1$ is reflected by the polarization beam splitter 53 and enters the projection lens 21, and the light of each of G and B modulated in the liquid crystal panel $20_2$ passes through the polarization beam splitter 53, and enters the projection lens 21.

Even in the two-panel type projection system 10 according to the example 4, it is possible to perform control similar to control in the example 1, that is, stepwise control of light output of each color of the light source 41 in the time-axis direction in accordance with responsiveness of the liquid crystal panel 20, and control similar to control in the example 3, that is, control for narrowing the interval of light source control in a region in which change in the response waveform of the liquid crystal panel 20 is steep. In the projection system 10 according to the example 4, having the two-panel configuration causes an increase in the number of color switching as compared with the single-panel configuration, which makes it possible to further improve brightness of the screen and further enhance an effect of preventing color mixing.

Example 5

An example 5 is a modification example of the example 4, and is an example in which light source control is performed in consideration of respective temperatures of the two liquid crystal panels $20_1$ and $20_2$. FIG. 11 illustrates a system configuration diagram of a projection system according to the example 5.

Responsiveness of the liquid crystal panel $20_1$ and responsiveness of the light crystal panel $20_2$ are respectively changed by an influence of temperature dependence of the liquid crystal panel $20_1$ and an influence of temperature dependence of the liquid crystal panel $20_2$. Accordingly, in the projection system 10 according to the example 5, in consideration of the respective temperatures of the liquid crystal panels $20_1$ and $20_2$, under control by the light source controller 431, control is performed to drive the light source 41 at a driving timing having a phase difference corresponding to the temperatures of the liquid crystal panels $20_1$ and $20_2$ with respect to respective driving timings of the liquid crystal panels $20_1$ and $20_2$.

Specifically, as illustrated in FIG. 11, the projection system 10 according to the example 5 includes temperature sensors $51_1$ and $51_2$ that respectively detect (obtain) the temperatures of the liquid crystal panels $20_1$ and $20_2$, and the memory 52 that stores, as a light source driving table, light source driving patterns for temperatures of the driving timing of the light source 41 with respect to the respective driving timings of the liquid crystal panels $20_1$ and $20_2$. Then, the light source controller 431 obtains a light source driving pattern corresponding to respective temperatures detected by the temperature sensors $51_1$ and $51_2$ from the light source driving table stored in the memory 52 to change the light source driving pattern, and drives the light source 41 on the basis of the thus-changed light source driving pattern.

As described above, even in the example 5, as with the example 2, considering that responsiveness of the liquid crystal panel $20_1$ and responsiveness of the light crystal panel $20_2$ are respectively changed by then influence of temperature dependence of the liquid crystal panel $20_1$ and then influence of temperature dependence of the liquid crystal panel $20_2$, the light source 41 is driven at a driving timing having a phase difference corresponding to the respective temperatures of the liquid crystal panels $20_1$ and $20_2$ with respect to the respective driving timings of the liquid crystal panels $20_1$ and $20_2$. This makes it possible to balance brightness of a projected image and color mixing more easily, as compared with the example 5.

Example 6

An example 6 is a modification example of the example 4, and is an example in which light source control is performed in consideration of a temperature of one of the two liquid crystal panels $20_1$ and $20_2$. FIG. 12 illustrates a system configuration diagram of a projection system according to the example 6.

The example 6 is an example in a case where there is not much difference between the liquid crystal panels $20_1$ and $20_2$ in change in responsiveness of the liquid crystal panels $20_1$ and $20_2$ caused by the influence of temperature dependence. Accordingly, the projection system 10 according to the example 6 detects a temperature of one of the liquid crystal panels $20_1$ and $20_2$, and reflects a result of such detection in light source control. Here, the temperature of the liquid crystal panel $20_1$ is detected by the temperature sensor $51_1$, and a light source driving pattern corresponding to a result of such detection is obtained from the light source driving table stored in the memory 52 to change the light source driving pattern. The light source 41 is driven on the basis of the thus-changed light source driving pattern.

In a case where there is not much difference in change in responsiveness of the liquid crystal panels $20_1$ and $20_2$ caused by the influence of the temperature dependence, even in the example 6, it is possible to balance brightness of a projected image and color mixing mores easily, as compared with the example 5. In addition, according to the example 6, it is possible to reduce components and simplify a control system, as compared with the example 5. Here, light source control is performed in consideration of the temperature of the liquid crystal panel $20_1$; however, needless to say, light source control may be performed in consideration of the temperature of the liquid crystal panel $20_2$.

MODIFICATION EXAMPLES

Although the technology of the present disclosure has been described with reference to preferred embodiments, the technology of the present disclosure is not limited to the embodiments. The configurations and structures of the projection systems described in the above embodiments are illustrative, and may be appropriately modified. For example, in the embodiments described above, a projection system including a reflective liquid crystal panel as a display panel has been described as an example; however, the technology of the present disclosure is also applicable to a projection system including a transmissive liquid crystal panel.

In addition, in the embodiments described above, a projection system using LCOS as a light modulation element has been described as an example; however, the light modulation element is not limited to the LCOS. Specifically, the technology of the present disclosure is also applicable to a projection system using, as the light modulation element, HTPS (High Temperature Poly Silicon) or an element such as an electromagnetic driven micromirror (a so-called MEMS mirror) using MEMS (Micro Electro Mechanical Systems) technology.

<Possible Configurations of Present Disclosure>

It is to be noted that the present disclosure may also have the following configurations.

<<A. Projection System>>

[A-1]
A projection system including:
a light source that outputs light of a plurality of colors;
a display panel that includes a light modulation element provided for each pixel, and modulates the light outputted from the light source;
a projection optical system that projects light having passed through the display panel; and
a controller that controls light output of each color of the light source in a time-axis direction.

[A-2]
The projection system according to [A-1], in which the display panel includes a liquid crystal panel including a liquid crystal element as the light modulation element.

[A-3]
The projection system according to [A-2], in which the controller performs field sequential driving for color-sequentially driving the light source in a time-division manner.

[A-4]
The projection system according to [A-3], in which the controller controls the light output of each color of the light source in the time-axis direction in a stepwise manner in accordance with responsiveness of the liquid crystal panel.

[A-5]
The projection system according to [A-4], in which the controller reduces or turns off light output between one color and another color of the light source.

[A-6]
The projection system according to [A-4], in which the controller performs control of light output in the time-axis direction to be proportional to a response waveform of the liquid crystal panel.

[A-7]
The projection system according to [A-4], in which the controller changes light output independently for respective colors of the light source in accordance with responsiveness of the liquid crystal panel.

[A-8]
The projection system according to any one of [A-1] to [A-7], in which the controller drives the light source with a light source driving pattern of a driving timing having a phase difference corresponding to a temperature of the liquid crystal panel with respect to a driving timing of the liquid crystal panel.

[A-9]
The projection system according to [A-8], including:
a temperature sensor that detects a temperature of the liquid crystal panel; and
a memory that stores, as a light source driving table, light source driving patterns for temperatures of a driving timing of the light source with respect to the driving timing of the liquid crystal panel, in which
the controller obtains a light source driving pattern corresponding to a temperature detected by the temperature sensor from the light source driving table, and drives the light source on the basis of the thus-obtained light source driving pattern.

[A-10]
The projection system according to any one of [A-1] to [A-9], in which the controller makes an interval of light source control in the time-axis direction controllable.

[A-11]
The projection system according to [A-10], in which the controller causes the interval of the light source control to be narrower in a region in which change in a response waveform of the liquid crystal panel is steep than in another region.

[A-12]
The projection system according to any one of [A-1] to [A-11], in which the display panel has a two-panel configuration provided with two liquid crystal panels.

[A-13]
The projection system according to [A-12], including:
a temperature sensor that detects a temperature of at least one of the two liquid crystal panels; and a memory that stores, as a light source driving table, light source driving patterns for temperatures of a driving timing of the light source with respect to driving timings of the two liquid crystal panels, in which the controller obtains a light source driving pattern corresponding to a temperature detected by the temperature sensor provided in at least one of the two liquid crystal panels from the light source driving table, and drives the light source on the basis of the thus-obtained light source driving pattern.

<<B. Control Method of Projection System>>

[B-1]

A control method of a projection system, the projection system including a light source that outputs light of a plurality of colors, a display panel that includes a light modulation element provided for each pixel, and modulates the light outputted from the light source, and a projection optical system that projects light having passed through the display panel, the control method including:

upon control of the projection system, controlling light output of each color of the light source in a time-axis direction.

[B-2]

The control method of the projection system according to [B-1], in which the display panel includes a liquid crystal panel including a liquid crystal element as the light modulation element.

[B-3]

The control method of the projection system according to [B-2], in which field sequential driving for color-sequentially driving the light source in a time-division manner is performed.

[B-4]

The control method of the projection system according to [B-3], in which the light output of each color of the light source is controlled in the time-axis direction in a stepwise manner in accordance with responsiveness of the liquid crystal panel.

[B-5]

The control method of the projection system according to [B-4], in which light output between one color and another color of the light source is reduced or turned off.

[B-6]

The control method of the projection system according to [B-4], in which control of light output in the time-axis direction is performed to be proportional to a response waveform of the liquid crystal panel.

[B-7]

The control method of the projection system according to [B-4], in which light output is changed independently for respective colors of the light source in accordance with responsiveness of the liquid crystal panel.

[B-8]

The control method of the projection system according to any one of [B-1] to [B-7], in which the light source is driven with a light source driving pattern of a driving timing having a phase difference corresponding to a temperature of the liquid crystal panel with respect to a driving timing of the liquid crystal panel.

[B-9]

The control method of the projection system according to [B-8], in which in a case where a temperature sensor and a memory are included, the temperature sensor that detects a temperature of the liquid crystal panel, and the memory that stores, as a light source driving table, light source driving patterns for temperatures of a driving timing of the light source with respect to the driving timing of the liquid crystal panel, a light source driving pattern corresponding to a temperature detected by the temperature sensor is obtained from the light source driving table, and the light source is driven on the basis of the thus-obtained light source driving pattern.

[B-10]

The control method of the projection system according to any one of [B-1] to [B-9], in which an interval of light source control in the time-axis direction is controllable.

[B-11]

The control method of the projection system according to [B-10], in which the interval of the light source control is narrower in a region in which change in a response waveform of the liquid crystal panel is steep than in another region.

[B-12]

The control method of the projection system according to any one of [B-1] to [B-11], in which the display panel has a two-panel configuration provided with two liquid crystal panels.

[B-13]

The control method of the projection system according to [B-12], in which in a case where a temperature sensor and a memory are included, the temperature sensor that detects a temperature of at least one of the two liquid crystal panels, and the memory that stores, as a light source driving table, light source driving patterns for temperatures of a driving timing of the light source with respect to driving timings of the two liquid crystal panels, a light source driving pattern corresponding to a temperature detected by the temperature sensor provided in at least one of the two liquid crystal panels is obtained from the light source driving table, and the light source is driven on the basis of the thus-obtained light source driving pattern.

REFERENCE SIGNS LIST

10 projection system
11R, 11G, 11B solid-state light source
13, 14 dichroic mirror
16 rod integrator
19 total reflection prism
20, 20$_1$, 20$_2$ liquid crystal panel
21 projection lens
30 screen
41 light source (light source unit)
42 image processing engine
43 system controller
44 light source driving section
51 temperature sensor
52 memory
53 polarization beam splitter
431 light source controller

The invention claimed is:

1. A projection system, comprising:
a light source configured to output light of a plurality of colors;
a liquid crystal panel that includes:
a light modulation element for each pixel, and
a liquid crystal element as the light modulation element, wherein the liquid crystal element is configured to modulate the light outputted from the light source;
a projection optical system configured to project light passed through the liquid crystal panel; and a controller configured to:
control light output of each of the plurality of colors of the light source in a time-axis direction,
perform field sequential driving for color-sequentially drive the light source in a time-division manner, and
control, based on responsiveness of the liquid crystal panel, the light output of each of the plurality of colors of the light source in the time-axis direction in a stepwise manner, wherein
the light output of each of the plurality of colors of the light source is proportional to a reflectance of the liquid crystal panel.

2. The projection system according to claim 1, wherein the controller is further configured to reduce or turn off light output between a first color and a second color of the plurality of colors.

3. The projection system according to claim 1, wherein the controller is further configured to change, based on the responsiveness of the liquid crystal panel, light output independently for respective colors of each of the plurality of colors of the light source.

4. The projection system according to claim 1, wherein the controller is further configured to drive the light source with a light source driving pattern of a driving timing that has a phase difference corresponding to a temperature of the liquid crystal panel, and
the driving timing has the phase difference with respect to a driving timing of the liquid crystal panel.

5. The projection system according to claim 4, comprising:
a temperature sensor configured to detect a temperature of the liquid crystal panel; and
a memory configured to store a light source driving table, wherein
the light source driving table includes a plurality of light source driving patterns of a driving timing of the light source with respect to the driving timing of the liquid crystal panel,
the plurality of driving patterns is for a plurality of temperatures, and
the controller is further configured to:
obtain a light source driving pattern corresponding to a temperature detected by the temperature sensor, wherein the light source driving pattern is obtained from the light source driving table, and
drive the light source based on the obtained light source driving pattern.

6. The projection system according to claim 1, wherein the projection system has a two-panel configuration with two liquid crystal panels.

7. The projection system according to claim 6, comprising:
a temperature sensor configured to detect a temperature of at least one of the two liquid crystal panels; and
a memory configured to store a light source driving table, wherein
the light source driving table includes a plurality of light source driving patterns of a driving timing of the light source with respect to driving timings of the two liquid crystal panels,
the plurality of driving patterns is for a plurality of temperatures, and
the controller is further configured to:
obtain a light source driving pattern corresponding to a temperature detected by the temperature sensor in at least one of the two liquid crystal panels, wherein the light source driving pattern is obtained from the light source driving table, and
drive the light source based on the obtained light source driving pattern.

8. A projection system, comprising:
a light source configured to output light of a plurality of colors;
a liquid crystal panel that includes:
a light modulation element for each pixel, and
a liquid crystal element as the light modulation element, wherein the liquid crystal element is configured to modulate the light outputted from the light source;
a projection optical system configured to project light having passed through the liquid crystal panel; and
a controller configured to:
control light output of each of the plurality of colors of the light source in a time-axis direction,
generate an interval of light source control in the time-axis direction to be controllable, and
control the interval of the light source control to be narrower in a first region than a second region, wherein
the first region has a change in a response waveform steeper than a response waveform in the second region, and
the light output of each of the plurality of colors of the light source is proportional to a reflectance of the liquid crystal panel.

9. A control method of a projection system, comprising:
outputting light of a plurality of colors from a light source;
modulating, by a liquid crystal element, the light outputted from the light source, wherein a liquid crystal panel includes the liquid crystal element as a light modulation element for each pixel;
projecting, by a projection optical system, light passed through the liquid crystal panel;
performing field sequential driving for color-sequentially driving the light source in a time-division manner; and
controlling, based on responsiveness of the liquid crystal panel, the light output of each of the plurality of colors of the light source in a time-axis direction in a stepwise manner, wherein
the light output of each of the plurality of colors of the light source is proportional to a reflectance of the liquid crystal panel.

10. A control method of a projection system, comprising:
outputting light of a plurality of colors from a light source;
modulating, by a liquid crystal element, the light outputted from the light source, wherein a liquid crystal panel includes the liquid crystal element as a light modulation element for each pixel;
projecting, by a projection optical system, light passed through the liquid crystal panel;
controlling light output of each of the plurality of colors of the light source in a time-axis direction;
generating an interval of light source control in the time-axis direction to be controllable,
controlling the interval of the light source to be narrower in a first region than a second region, wherein
the first region has a change in a response waveform steeper than a response waveform in the second region, and
the light output of each of the plurality of colors of the light source is proportional to a reflectance of the liquid crystal panel.

\* \* \* \* \*